M. A. KENDALL.
PULLEY.
APPLICATION FILED DEC. 27, 1910.
1,008,475.
Patented Nov. 14, 1911.
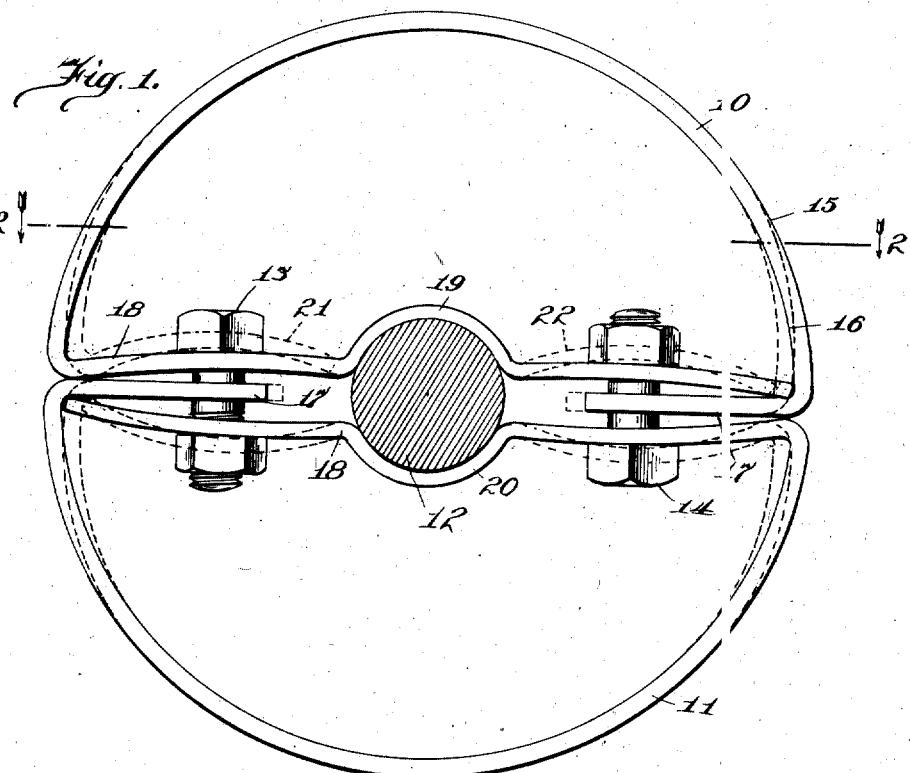
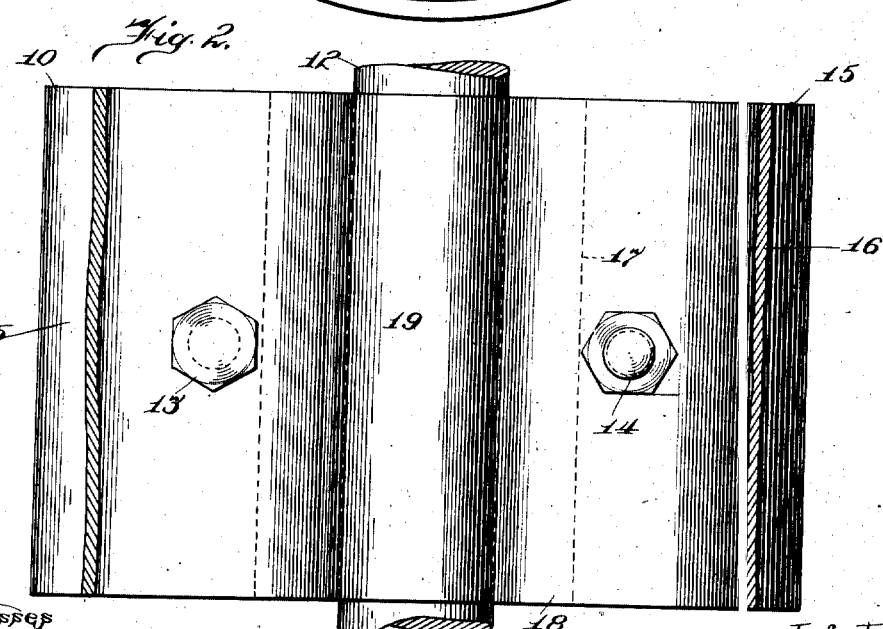
Witnesses
Milton Lenoir
E. M. Hatcher
Inventor
Myron A. Kendall
by Gillson & Gillson
Attorneys

UNITED STATES PATENT OFFICE.

MYRON A. KENDALL, OF AURORA, ILLINOIS, ASSIGNOR TO STEPHEN S-ADAMSON MNFG. CO., A CORPORATION OF ILLINOIS.

PULLEY.

1,008,475.  Specification of Letters Patent.  Patented Nov. 14, 1911.

Application filed December 27, 1910. Serial No. 599,558.

*To all whom it may concern:*

Be it known that I, MYRON A. KENDALL, a citizen of the United States, and resident of Aurora, county of Kane, and State of Illinois, have invented certain new and useful Improvements in Pulleys, of which the following is a specification, and which are illustrated in the accompanying drawings, forming a part thereof.

The invention relates to pulleys, and more particularly to so-called divided or split pulleys adapted to be applied to a shaft without passing the pulley over the end of the shaft.

The object of the invention is to provide a split pulley which though being made of simple and inexpensive construction by being composed of parts formed from stamped metal is nevertheless durable and rigid when the parts are fitted together.

To this end the invention contemplates a pulley composed of detachably connected parts or halves, each of which is completely formed from a stamped metal plate.

In the accompanying drawings Figure 1 is a side elevation of a pulley constructed in accordance with the invention, a shaft to which the pulley is applied being shown in cross-section; and Fig. 2 is a plan sectional view taken on the line 2—2 of Fig. 1.

The pulley provided by the invention is preferably composed of two halves or parts, designated, respectively, 10 and 11 in the drawings. These halves or parts are adapted to be applied to a shaft, as 12, from opposite sides, whereupon they will be connected by clamping bolts, as 13, 14.

As shown, the pulley has a flat face or periphery 15 adapted to be engaged by a belt or traveling conveyer. Preferably the two halves 10, 11, of the pulley are alike, and each is completely formed by stamping a metal plate, the width of the face 15 of the pulley being determined by the width of the plate. In stamping the plate the intermediate portion 16 is bent to substantially semi-circular form, and the end portions, as 17, 18, are turned inwardly to substantially follow the diameter of the circle formed by fitting together the curved portions 16 of the several parts.

When the pulley is completely formed of but two parts, or halves, as shown, the end portions 17, 18, of the plate forming each of the parts are of unequal length, the longer end portion, as 18, being substantially equal to the diameter of the pulley, and the shorter end portion, as 17, being of less length than half the diameter of the pulley, whereby these end portions of the plate are overlapped adjacent one side of the pulley and the free end of the longer end portion bears against the curved portion of the plate upon the inside. By means of this construction the inturned longer end portion of the plate forms a brace for preventing distortion of the pulley by external pressure. To provide a hub for receiving a shaft or mandrel 12, the longer inturned end portions 18 of the two plates are oppositely bowed adjacent the center of the pulley, as indicated at 19, 20.

In applying the pulley to a shaft, as 12, the two halves or parts, as 10, 11, are fitted upon the shaft from opposite sides, and preferably with the longer inturned end portions 18 of the two plates extended in opposite directions, as shown, whereby the overlapped end portions of the two plates are located upon opposite sides of the shaft. The parts of the pulley are then united by the clamping bolts, as 13, 14, at each side of the shaft, each of the bolts being thereby passed through both of the inturned end portions 17, 18, of one of the plates, and through but one of the inturned end portions, as 18, of the other plate.

In some instances it may be desirable to have the parts, as 21, 22, of the inturned ends 18 of the two plates at each side of the hub portions 19, 20, so curved that they will yield under pressure applied by the clamping bolts 13, 14. In such cases the rounded peripheral portions 16 of the parts will be curved somewhat more sharply than a semi-circle, as indicated by dotted lines in Fig. 1, the pulley being brought to true circular form by the straightening out of the curved intermediate portions 21, 22, under the pressure applied by the drawing up of the clamping bolts 13, 14.

I claim as my invention—

1. In a split pulley, in combination, a pair of mating plates each bent to semi-circular form intermediate its ends, the end portions of each plate being inturned and overlapped upon the diameter of the circle formed by the mating of the two plates, one of the end portions of each plate being bowed for engagement with a shaft and such end portion of each plate being equal in length to the diameter of the said circle and being lapped upon the inside of the other end portion of the same plate whereby its free end bears against the curved portion of said plate upon the inside, and bolts connecting the plates at opposite sides of the said shaft engaging portions, each of said bolts being passed through both of the overlapped end portions of one of the plates.

2. In a split pulley, in combination, a pair of yielding mating plates, a part of each plate being bent to substantially the form of a semi-circle and an end portion of each plate being inturned to substantially follow the diameter of the circle formed by the mating of the two plates but being curved away from such diameter intermediate its ends toward the first mentioned curved part of the same plate and having its free end bearing against the said first mentioned curved part of the plate upon the inside, and a clamping bolt connecting the two plates such bolt being passed through and compressing the curved inturned end portions of the plates.

3. In a split pulley, in combination, a pair of yielding mating plates, a part of each plate being bent to substantially the form of a semi-circle and an end portion of each plate being inturned to substantially follow the diameter of the circle formed by the mating of the two plates, the free end of such inturned end portion of each plate bearing upon the first mentioned curved part of the same plate upon the inside, the said inturned end portions of the plates being oppositely bowed intermediate their ends to form a shaft receiving hub, and the inturned end portion of each plate being curved away from the said diameter of the circle toward the first mentioned curved part of the same plate at each side of said hub, and a pair of clamping bolts connecting the plates, each of said clamping bolts being passed through and compressing one of the last mentioned curved parts of the inturned end portion of each plate.

MYRON A. KENDALL.

Witnesses:
 Jos. P. Ahlers,
 F. H. McWethy.